US012712644B2

(12) United States Patent
Englund

(10) Patent No.: US 12,712,644 B2
(45) Date of Patent: Aug. 18, 2026

(54) RESOURCE-EFFICIENT COHERENT OPTICAL FREQUENCY TRANSFER FOR DISTRIBUTED QUANTUM COMPUTING AND THE QUANTUM INTERNET OF THINGS

(71) Applicant: Massachusetts Institute of Technology, Cambridge, MA (US)

(72) Inventor: Dirk R. Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 19/119,688

(22) PCT Filed: Oct. 19, 2023

(86) PCT No.: PCT/US2023/035510
§ 371 (c)(1),
(2) Date: Apr. 9, 2025

(87) PCT Pub. No.: WO2024/196403
PCT Pub. Date: Sep. 26, 2024

(65) Prior Publication Data

US 2026/0005773 A1 Jan. 1, 2026

Related U.S. Application Data

(60) Provisional application No. 63/418,096, filed on Oct. 21, 2022.

(51) Int. Cl.
*H04B 10/70* (2013.01)
*H04B 10/25* (2013.01)

(52) U.S. Cl.
CPC ............ *H04B 10/70* (2013.01); *H04B 10/25* (2013.01)

(58) Field of Classification Search
CPC ..................................................... H04B 10/70
See application file for complete search history.

(56) References Cited

U.S. PATENT DOCUMENTS

2014/0355998 A1 12/2014 Tanzilli et al.
2019/0138928 A1 5/2019 Monroe et al.

FOREIGN PATENT DOCUMENTS

WO 2022/073715 A1 4/2022
WO 2022/165134 A1 8/2022

OTHER PUBLICATIONS

Chen et al., "Zero-Added-Loss Entangled-Photon Multiplexing for Ground- and Space-Based Quantum Networks," Physical Review Applied. vol. 19, 25 pages, May 2023.

(Continued)

*Primary Examiner* — Nathan M Cors
(74) *Attorney, Agent, or Firm* — Nields, Lemack & Frame, LLC

(57) ABSTRACT

A unified quantum network architecture is introduced that seamlessly applies to all memory types while sharply reducing experimental overhead. The scheme depends on the following elements: A unified quantum network framework based on photon heralding. As a unified quantum network framework, a scheme for optically heralded entanglement that applies to superconductor-to-optical interfaces equally as to other memory-photon interfaces (such as spin-photon interfaces, and others). To address the challenges noted above, a scheme termed "Universal Quantum Bus" (UQB) is introduced. UQB is described for connecting diamond color centers across a telecom fiber network, however the scheme works equally for all other memory types.

9 Claims, 4 Drawing Sheets

(56) References Cited

OTHER PUBLICATIONS

International Search Report and Written Opinion mailed Feb. 13, 2025 in corresponding PCT application No. PCT/US2023/035510.

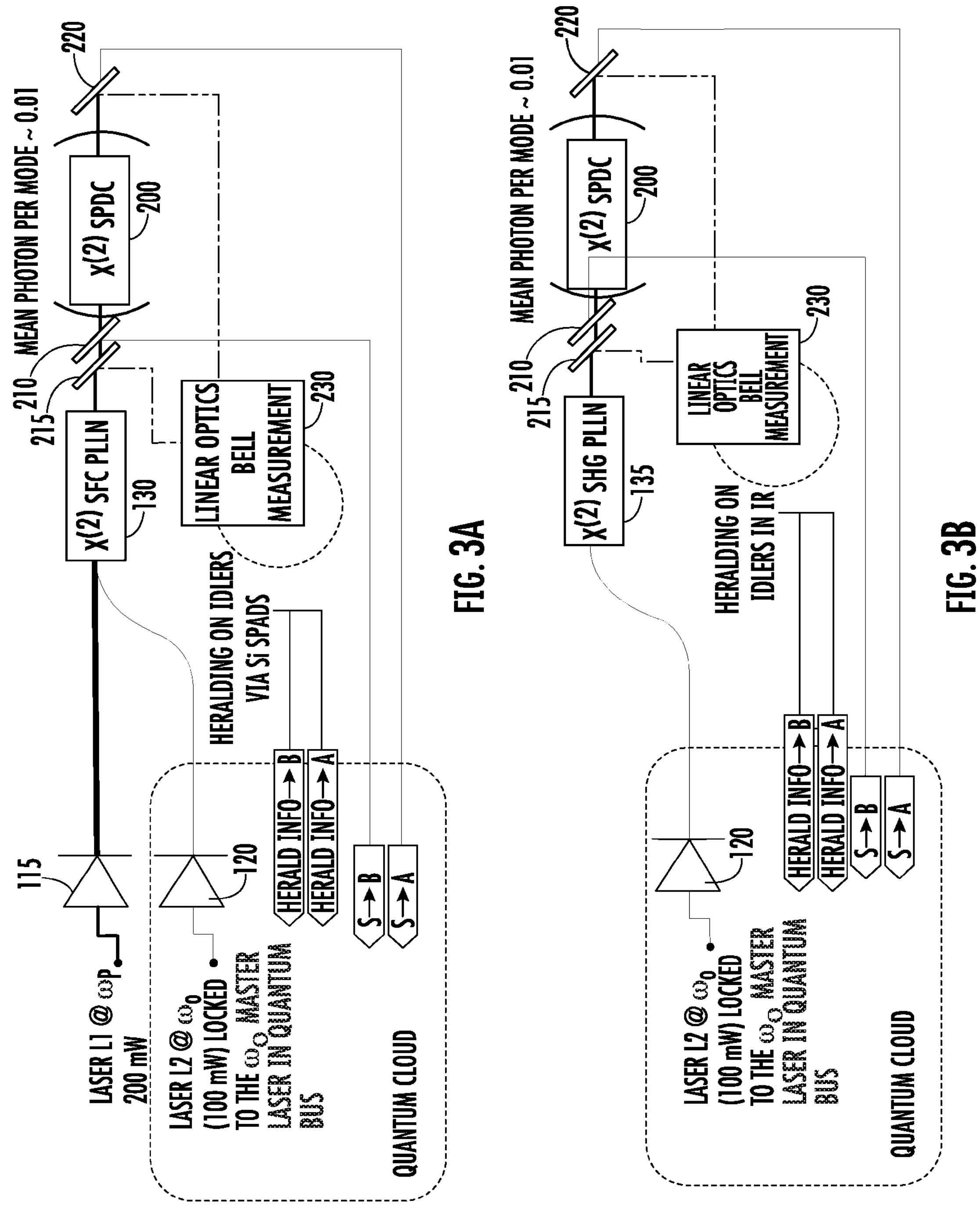

MEAN PHOTON PER MODE ~ 0.01
220
$X^{(2)}$ SPDC
200
210
215
$X^{(2)}$ SFC PLLN
130
LINEAR OPTICS BELL MEASUREMENT
230
HERALDING ON IDLERS VIA Si SPADS
LASER L1 @ $\omega_P$ 200 mW
115
LASER L2 @ $\omega_0$ (100 mW) LOCKED TO THE $\omega_0$ MASTER LASER IN QUANTUM BUS
120
HERALD INFO→B
HERALD INFO→A
S→B
S→A
QUANTUM CLOUD
FIG. 3A
MEAN PHOTON PER MODE ~ 0.01
220
$X^{(2)}$ SPDC
200
210
215
$X^{(2)}$ SHG PLLN
135
LINEAR OPTICS BELL MEASUREMENT
230
HERALDING ON IDLERS IN IR
LASER L2 @ $\omega_0$ (100 mW) LOCKED TO THE $\omega_0$ MASTER LASER IN QUANTUM BUS
120
HERALD INFO→B
HERALD INFO→A
S→B
S→A
QUANTUM CLOUD
FIG. 3B

RESOURCE-EFFICIENT COHERENT OPTICAL FREQUENCY TRANSFER FOR DISTRIBUTED QUANTUM COMPUTING AND THE QUANTUM INTERNET OF THINGS

This application claims priority to U.S. Provisional Patent Application Ser. No. 63/418,096, filed Oct. 21, 2022, the disclosure of which is incorporated by reference in its entirety.

This invention was made with government support under EEC1941583 awarded by the National Science Foundation, and FA8702-15-D-0001 awarded by the U.S. Air Force. The government has certain rights in the invention.

FIELD

This disclosure describes a clock distribution scheme in a unified transmission control protocol for quantum networks.

BACKGROUND

A central goal in quantum information science and technology is the generation of quantum entanglement over large numbers of quantum memories, which may bridge long distances and are made up of different physical modalities, such as atoms, microwaves in superconductors, ions, solid state spins, and others. These enabled quantum networks would have many applications, from information security to sensing to distributed quantum computing to cryptocurrency without energy-intensive proof-of-work.

Currently, entanglement distribution has been achieved by heralded optical links between color centers in diamond, trapped ions, and other systems.

The central challenge today is to improve the rate and fidelity of entanglement distribution among stationary quantum memories via optical channels, as these currently limit quantum networks and optical connections among heterogeneous quantum memory types. There are several critical underlying challenges:

(C1) The difficulty, and most importantly, low efficiency and added noise in converting optical modes between frequencies that are suitable for quantum memory interfaces to an optical bus, which is most commonly a telecom frequency;

(C2) The difficulty in frequency and phase distribution across the network;

(C3) The great complexity and expense of laser systems used at every quantum memory station; and (C4) The lack of a unified approach that applies to all leading memory architectures.

Specifically, currently, to address the second and third challenges, every repeater is required to be locked to a stable local frequency reference, such as an atomic vapor cell or a temperature-stabilized reference cavity, such as a stable laser systems reference cavity that costs in excess of $30 k. Furthermore, every station has a set of lasers for resonantly addressing the quantum memory in addition to needing nonlinear optics and lasers for sum/difference frequency generation by 3-wave or 4-wave mixing processes.

Therefore, it would be beneficial if there was a unified quantum network architecture that seamlessly applies to all memory types while sharply reducing experimental overhead.

SUMMARY

A unified quantum network architecture is introduced that seamlessly applies to all memory types while sharply reducing experimental overhead. The scheme depends on a unified quantum network framework based on photon heralding. As a unified quantum network framework, the scheme for optically heralded entanglement applies to superconductor-to-optical interfaces equally as to other memory-photon interfaces (such as spin-photon interfaces, and others). To address the first three challenges noted above, a scheme termed "Universal Quantum Bus" (UQB) is introduced. UQB is described for connecting diamond color centers across a telecom fiber network, however the scheme works equally for all other memory types.

According to one embodiment, a quantum network is disclosed. The quantum network comprises a plurality of nodes, wherein each node j comprises a plurality (k) of quantum memories, wherein each node j utilizes an oscillator to drive quantum memory transitions at frequencies $\omega_{j,k}$, wherein the plurality of nodes are connected across a telecom fiber network; a quantum bus channel that allows a master laser at frequency $\omega_o$ to be distributed across the quantum network; and a non-linear crystal to couple $\omega_o$ and $\omega_{j,k}$. In some embodiments, the quantum memories comprise a modality selected from the group consisting of atoms, microwaves in superconductors, ions, and solid state spins.

In some embodiments, the node j uses a local oscillator to generate $\omega_{c,k}$, which is used to produce an electromagnetic field $\omega_{j,k}=\omega_{c,k}+\omega_0$ by sum-frequency generation. In certain embodiments, the node j locally generates $\omega_{c,k}=\omega_{c,0}+\Delta\omega_{c,k}$ where $\Delta\omega_{c,k}$ is dynamically adjusted to tune from a local laser oscillator at $\omega_{c,0}$ to $\omega_{c,k}$. In certain embodiments, the node j interacts with the quantum memory at frequency $\omega_{j,k}$ with the electromagnetic field produced by sum-frequency generation at $\omega_{j,k}$.

In some embodiments, the node j uses a local oscillator to generate $\omega_{c,k}-j_{QITU}\,\Delta\omega_{oQITU}$, which is used to produce an electromagnetic field $\omega_0+j_{QITU}\Delta\omega_{oQITU}$ from $\omega_{j,k}$ by difference-frequency generation. In certain embodiments, the electromagnetic field $\omega_0+j_{QITU}\Delta\omega_{oQITU}$ is a different quantum bus channel.

In some embodiments, the node j comprises a local oscillator to generate $\omega_{c,0}$, a first modulator to generate $\omega_{c,k}=\omega_{c,0}+\Delta\omega_{c,k}$, a second modulator to generate $\omega_{c,k}-j_{QITU}\Delta\omega_{oQITU}$, a sum-frequency generator to create $\omega_{j,k}=\omega_{c,k}+\omega_0$, and a difference-frequency generator to create $\omega_0+j_{QITU}\Delta\omega_{oQITU}$. In certain embodiments, the first modulator and the second modulator are one component that is used in a time multiplexed manner.

According to another embodiment, a zero-added-loss-multiplexing midpoint source is disclosed. The zero-added-loss-multiplexing midpoint source comprises a laser used to generate a first frequency; a frequency generator to create a higher frequency using the first frequency as an input; a spontaneous parametric downconversion (SPDC) source that uses the higher frequency as an input and generates pairs of photons, each pair comprising an idler photon and a signal photon; and a linear Bell measurement circuit to detect a presence of two idler photons created simultaneously by the SPDC source and to generate heralding signals to two memory nodes when the presence of two idler photons is detected. In some embodiments, the frequency generator comprises a second harmonic generator (SHG), and wherein the higher frequency is twice the first frequency. In some embodiments, the zero-added-loss-multiplexing midpoint source comprises a second laser used to generate a second frequency, wherein the frequency generator comprises a sum-frequency generator, and wherein the higher frequency is a sum of the first frequency and the second frequency. In some embodiments, a frequency of the signal photon is in an O band and wherein the signal photon is transmitted on a quantum bus channel.

According to another embodiment, a quantum network is disclosed. The quantum network comprises two memory nodes, each comprising a quantum memory; and a zero-added-loss-multiplexing midpoint source, wherein the zero-added-loss-multiplexing midpoint source comprises: a first laser used to generate a first frequency; a second laser used to generate a second frequency; a sum frequency generator to create a higher frequency using the first frequency and the second frequency as inputs; a spontaneous parametric down-conversion (SPDC) source that uses the higher frequency as an input and generates pairs of photons, each pair comprising an idler photon and a signal photon; and a linear Bell measurement circuit to detect a presence of two idler photons created simultaneously by the SPDC source and to generate heralding information to the two memory nodes when the presence of two idler photons is detected. In some embodiments, the zero-added-loss-multiplexing midpoint source comprises two modulators, each modulator adapted to modulate a phase and amplitude of an output from one of the first laser and the second laser to generate the first frequency and the second frequency, respectively.

In some embodiments, the two memory nodes each comprise a modulator to tune an input frequency based on the heralding information; and a sum frequency generator having an output from the modulator and the signal photon as inputs, wherein an output of the sum frequency generator is an excitation frequency used to access the quantum memory. In certain embodiments, the modulator disposed in each memory node is adapted to modulate a phase and amplitude of the input frequency. In certain embodiments, the first frequency from the first laser is transmitted from the zero-added-loss-multiplexing midpoint source to a memory node, and wherein the first frequency is the input frequency. In certain embodiments, the input frequency is generated locally by each of the two memory nodes.

BRIEF DESCRIPTION OF THE DRAWINGS

For a better understanding of the present disclosure, reference is made to the accompanying drawings, in which like elements are referenced with like numerals, and in which:

FIGS. 3A-3B show two implementations that may be utilized to realize the Zero-Added-Loss Multiplexing (ZALM) scheme as a midpoint source.

DETAILED DESCRIPTION

Figure 1:
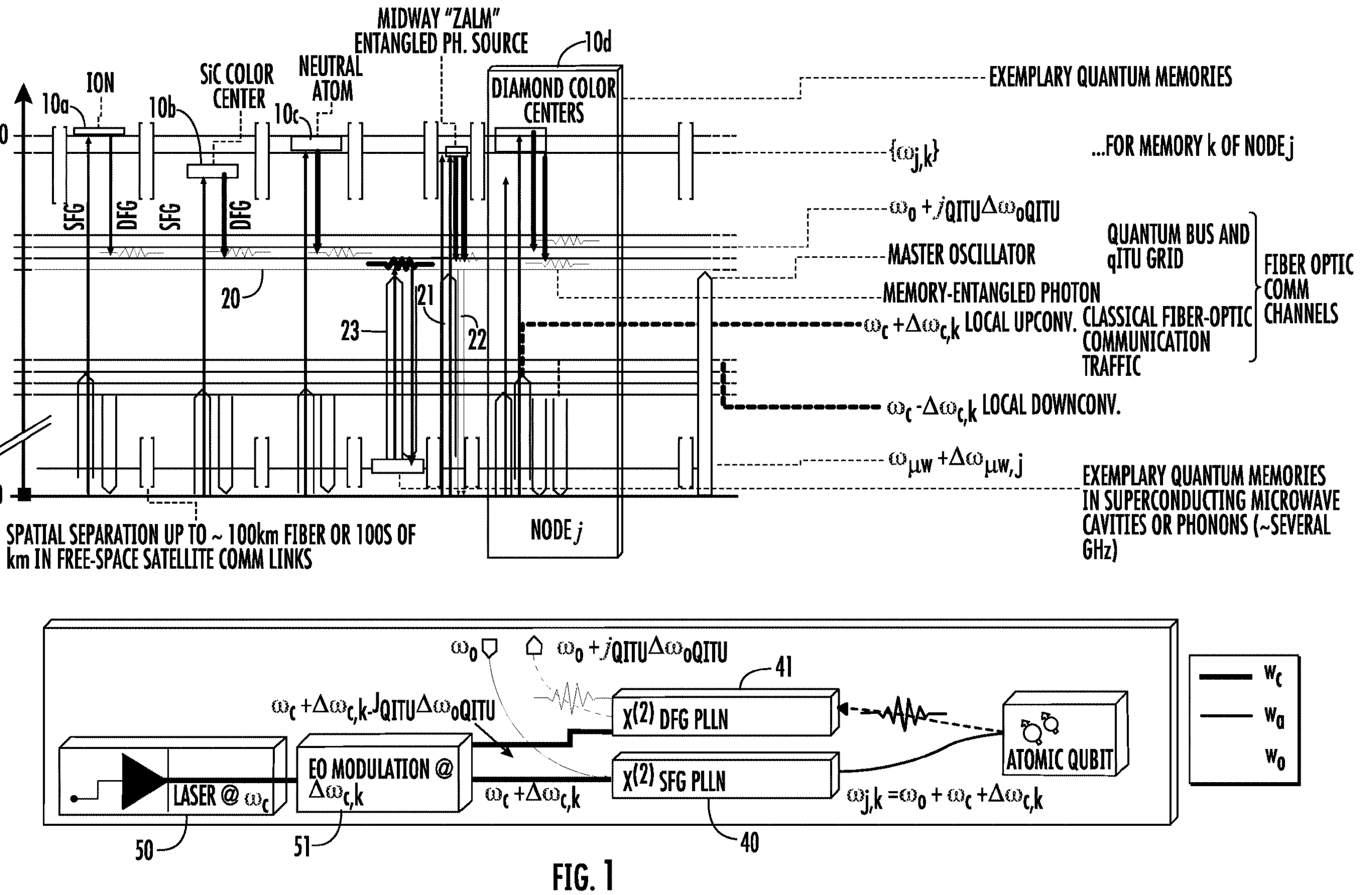
FIG. 1 is a block diagram showing the quantum bus connecting all leading quantum memory modalities by distributing the master oscillator at $\omega_o$. Local nodes perform sum- and difference-frequency generation locked to $\omega_o$. By this "Universal Quantum Bus" (UQB) scheme, all laser fields and qubits are synchronized across the network.

In the figures, the legend at the lower right of FIG. 1 is used throughout to denote the approximate frequency of various signals in the figures.

As shown in FIG. 1, a plurality of quantum network nodes, with possibly different memory modalities, are connected, possibly at great distance, to a common "quantum bus channel". The modalities may include atoms, microwaves in superconductors, ions, solid state spins and others. The nodes can communicate via a classical channel, which, for example, may be in the telecom c-band at frequency $\omega_c/2\pi$. The nodes may be ground-based or on moving platforms, such as vehicles or satellites.

This framework comprises the following elements:

A classical communication channel in the telecom band near $c/(\omega_c/2\pi)=1.55$ μm. The frequency range of $\omega_c/2\pi$ may be between 100 THz and 270 THz.

A plurality of nodes 10*a*-10*d* wherein each node j comprises a multitude of quantum memories $k=1 \ldots N_j$ with transition frequencies $\omega_{j,k}$, where $\omega_{j,k}$ is the transition frequency of the $k^{th}$ memory in the $j^{th}$ node.

a "quantum bus" channel 20 at frequency $\omega_0$ with a wavelength $2\pi c/\omega_0$ in the telecom "o-band", where $\omega_0/2\pi$ may be in the range of 200 THz to 300 THz. This channel has low fiber loss, allowing a master laser at $\omega_o$ to be distributed across networks of quantum network nodes j, which may be done using phase locking methods. Recent methods have achieved fractional-frequency instability of $7\times10^{-17}$ across more than 2000 km of fiber.

Above $\omega_o$ are additional dark fiber channels at frequencies $\omega_o+j_{QITU}\Delta\omega_{oQITU}$ indexed as a "quantum ITU" grid $j_{QITU}=1 \ldots N_{qITU}$, where the channel spacing approximately matches the bandwidth of coherent optical transitions of optical to quantum memory transitions. In one embodiment, it is assumed that $\Delta\omega_{oQITU}/2\pi=500$ MHz and $N_{QITU}=1$ THz/$(\Delta\omega_{oQITU}/2\pi)\sim2\cdot10^3$, although other values may be used.

The quantum bus 20 connects all leading quantum memory modalities by distributing the master oscillator at $\omega_o$. As seen in the bottom of FIG. 1, local nodes 10*a*-10*d* perform sum-frequency generation (SFG) and difference-frequency generation (DFG) locked to $\omega_o$. By this "universal quantum bus" (UQB) scheme, all laser fields and qubits are synchronized across the network.

A nonlinear optical interaction to couple between $\omega_{j,k}$ and $\omega_o$. Specifically, three-wave mixing, or 4-wave mixing, in a nonlinear crystal with a second-order nonlinearity or 3rd order nonlinearity, respectively, such as lithium niobate (LN) or silicon. In particular, for a negatively charged diamond silicon vacancy (SiV) quantum memory system, 3-wave mixing via periodically poled LN (PPLN) may be used.

One important aspect is the generation of local memory-resonant laser at frequency $\omega_{j,k}$. Specifically, Node j requires a laser field to resonantly drive quantum memory transitions $\omega_{j,k}$.

Traditionally, $\omega_{j,k}$ is produced by a laser oscillator that must be stabilized to a frequency reference, such as an (atomic vapor transition+(wave meter or frequency comb)) or (a temperature-stabilized reference cavity—for example from Stable Laser Systems)). In the case of the SiV-center, the common approach is to either tune an external cavity diode laser or a Ti: Sapphire laser to $\omega_{j,k}$, using the above-mentioned stabilization schemes for frequency reference. The first option costs above $25 k and the second option costs above $100 k; both are research-grade laser oscillators with low deployability compared to telecom equipment. The stabilization systems incur additional costs starting at about $30 k and require a great deal of extra volume (~m$^3$) and have laboratory-grade requirements on humidity, temperature, and other conditions.

In contrast, in the present system, Node j uses a local laser $\omega_c$ 50 and a frequency local shift $\Delta\omega_{c,k}$ to produce the electromagnetic field $\omega_{j,k}=\omega_{c,k}+\omega_0$ by sum-frequency generation 40 (SFG), as shown in the bottom of FIG. 1. The node locally generates $\omega_{c,k}=\omega_{c,0}+\Delta\omega_{c,k}$ where $\Delta\omega_{c,k}$ is dynamically adjusted to tune from a local laser oscillator at $\omega_{c,0}$ to $\omega_{c,k}$. Throughout this disclosure, the terms $\omega_c$ and $\omega_{c,0}$ are used interchangeably. It can generate the frequency shift $\Delta\omega_{c,k}$ by electro-optic (EO) phase modulation (including single-sideband modulation or serrodyne frequency shifting) or frequency modulation continuous-wave (fmcw) in, for example, DFB lasers used in coherent lidar. In one embodiment, the voltages applied to the opposite sides of the crystal in the electro-optic (EO) phase modulator 51 are configured to achieve a first predefined frequency shift. This may be achieved by applying two voltages to the crystal, that are separated by a first fixed voltage and wherein both voltages are increasing, typically using a sawtooth waveform. The rate at which the voltages are changing determines the frequency shift that is generated. This is referred to as serrodyne frequency shifting. The laser oscillator at $\omega_{c,0}$ should be stable to a frequency range of $\epsilon\ \Delta\omega_{j,k}$, where $\Delta\omega_{j,k}$ denotes the atomic transition linewidth for the $k^{th}$ memory in node j, and $\epsilon<<1$ is a tolerance. Specifically, for the SiV-center in diamond, $\Delta\omega_{j,k}$ is around 100 MHz and the targeted error tolerance $\epsilon\sim10^{-3}$ is small enough to avoid contributing significantly to usual error budgets. For SiV-, $\omega_{c,0}/2\pi$ is in or near the telecom c-band, where there exists a wide offering of low-cost, high-value deployable laser oscillators. Node j can lock $\omega_{c,0}$ to a stable laser field distributed within an ITU channel using phase locked loop (PLL) methods that are common in coherent laser communications. Thus, in summary, the output of a laser 50, operating at $\omega_{c,0}$, is frequency shifted using the electro-optic (EO) phase modulator 51 to generate $\omega_{c,k}=\omega_{c,0}+\Delta\omega_{c,k}$. This output, $\omega_{c,k}$, is then summed with $\omega_0$ using sum-frequency generation 40 to generate the electromagnetic field $\omega_{j,k}$.

Phase modulation, such as binary phase shift keying (BPSK), on this channel can simultaneously serve for classical communications, which is necessary for every node. A line code or periodic calibration tone can stabilize the center frequency of $\omega_{c,0}$ to below 1 MHz over the PLL bandwidth. As will be described below, the UQB scheme also works with short-term frequency stability: all that is required is stability during frequency up-conversion to $\omega_{j,k}=\omega_{c,k}+\omega$ and, after the $\omega_{j,k}$ field has interacted with the atomic memory (for a duration $\sim1/\Delta\omega_{j,k}\sim10$ ns), down-conversion to $\omega_o+j_{QITU}\Delta\omega_{oQITU}=\omega_{j,k}-(\omega_{c,k}-j_{QITU}\Delta\omega_{oQITU})$, where $j_{QITU}\Delta\omega_{oQITU}$ is a frequency offset by $j_{QITU}$ qITU channel spacings from the quantum bus base frequency $\omega_0$. The down-conversion is performed using difference frequency generation 41.

For memory-photon entanglement, node j interacts with the quantum memory at frequency $\omega_{j,k}$ with the laser field produced by sum-frequency generation at $\omega_{j,k}$. Alternatively, some schemes prefer a slight detuning of $\delta\omega_{j,k}\sim$ few GHz for Raman-mediated interactions, but in those instances, it can be assumed that the memory is at a different frequency $\omega_{j,k}+\delta\omega_{j,k}$ and the remainder of the mechanism remains as described above.

Frequency down-conversion is performed from $\omega_{j,k}$ back to a target channel $j_{QITU}$ in the quantum bus band at $\omega_o+j_{QITU}\Delta\omega_{oQITU}$. To this end, the node performs difference frequency generation 41 according to $\omega_{j,k}-\omega_{c,k'}$, where $\omega_{c,k'}=\omega_{c,k}-j_{QITU}\Delta\omega_{oQITU}$ is generated as described above (but, for example, with an updated waveform applied to the phase modulator or fmcw DFB driver). Specifically, during the down-conversion, the voltages applied to opposite sides of the crystal in the electro-optic (EO) phase modulator 51 are configured to achieve a second predefined frequency shift. Note that the polarity of this frequency shift may be opposite the polarity of the first defined frequency shift. This may be achieved by applying two voltages to the crystal, that are separated by a second fixed voltage and wherein both voltages are decreasing, such as through the use of a sawtooth waveform. As noted above, this is referred to as serrodyne frequency shifting. The choice of the QITU channel index $j_{QITU}$ will depend on network traffic conditions. The $j_{QITU}$ information is communication in the classical header information accompanying quantum transmissions. If a station wants to couple a photon in frequency channel $\omega_0+j'_{QITU}\Delta\omega_{oQITU}$ to $\omega_{j,k}$, it simply incorporates the additional channel spacing $j'_{QITU}\Delta\omega_{oQITU}$ into the upconversion according to $\omega_{j,k}=(\omega_{c,k}-j'_{QITU}\Delta\omega_{oQITU})+\omega_0$.

Note that $\omega_0$, $\omega_{c,k}$ and the QITU grid channels all lie within the traditional fiberoptic communications channels.

Thus, in operation, during the up-conversion, the electro-optic (EO) phase modulator 51 is configured to introduce a first frequency shift to the carrier frequency ($\omega_c$), which is then added to the master oscillator ($\omega_o$) to generate the electromagnetic field $\omega_{j,k}$ which is used to interact with the quantum memory. The quantum memory then produces an output. This output is then down-converted so that it occupies one of the designated channels in the UQB scheme. This may be done by reconfiguring electro-optic (EO) phase modulator 51 to introduce a second frequency shift to the carrier frequency ($\omega_c$), which is then subtracted from the frequency output by the quantum memory to shift the output to the desired channel. In another embodiment, separate EO phase modulators may be used to achieve these two frequency shifts.

The shape of the optical wave packet at frequency $\omega_{j,k}$ impacts how efficiently the photon is absorbed into or scatters from the atomic transition. For a unified approach, it is assumed that all wavepackets in the QITU grid to be filtered to spatiotemporal modes with a Gaussian envelope having full width half maximum (FWHM) of $x_{oQITU}\Delta\omega_{oQITU}$ where $x_{oQITU}\sim0.2$ to minimize cross-talk. To optimize the overlap of the single-sided-exponential envelope of a wave-packet produced by spontaneous emission with this filter function, pulse shaping of the pump field in the downconversion step can be utilized. For photon-memory entanglement by coherent scattering, mode matching may be optimized by coherent reshaping of optical modes in time and frequency by three-wave mixing.

The frequency mixing functions may be conveniently implemented in photonic circuits, such as thin film lithium niobate ($\chi^{(2)}$ or Si or SiN ($\chi^{(3)}$.

The nonlinear optical components may be used to implement the recently proposed "zero added loss multiplexed" (ZALM) entanglement source, which improves the entanglement distribution across a channel with transmission $\eta$ to $\sqrt{\eta}$ instead of the usual $\eta$ scaling for a two-photon entanglement scheme, in (presently universal) situations of $\eta<<1$ and small quantum memory buffers at every station. Thus, every quantum memory node can also double as a midpoint entangled photon source—or simple optics-only and memoryless ZALM nodes—can enhance quantum network entanglement distribution.

Figure 2A:
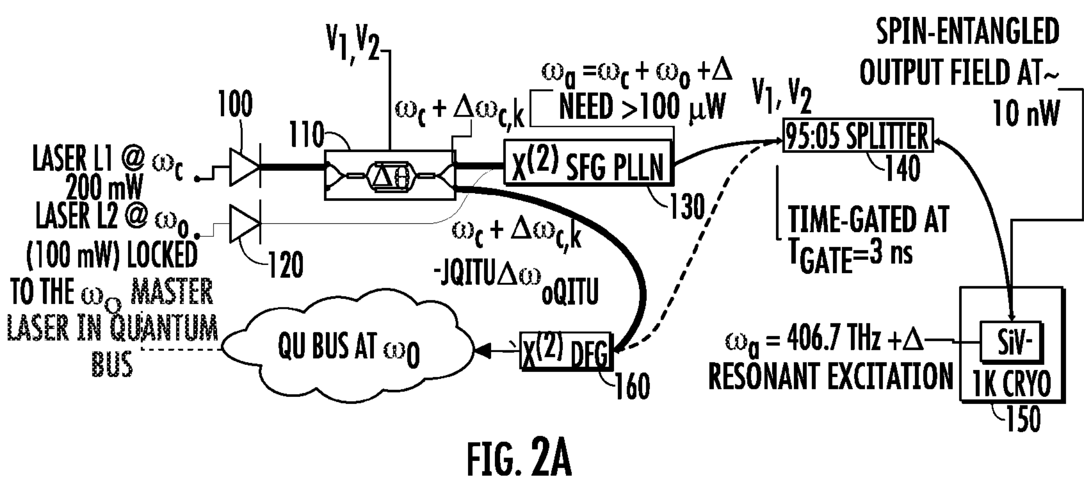
FIGS. 2A-2C show three possible implementations of quantum repeater node j.
Figure 2B:
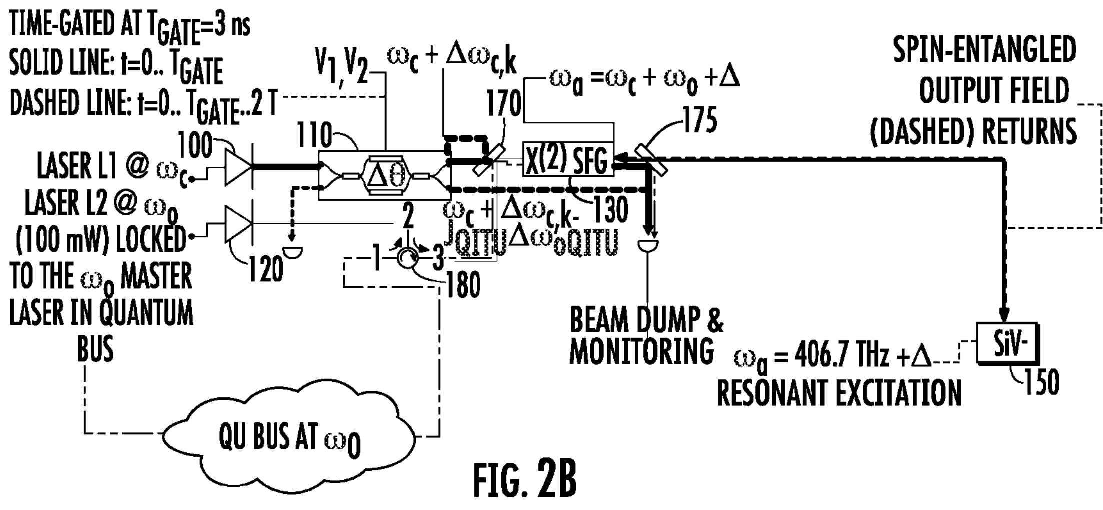
Figure 2C:
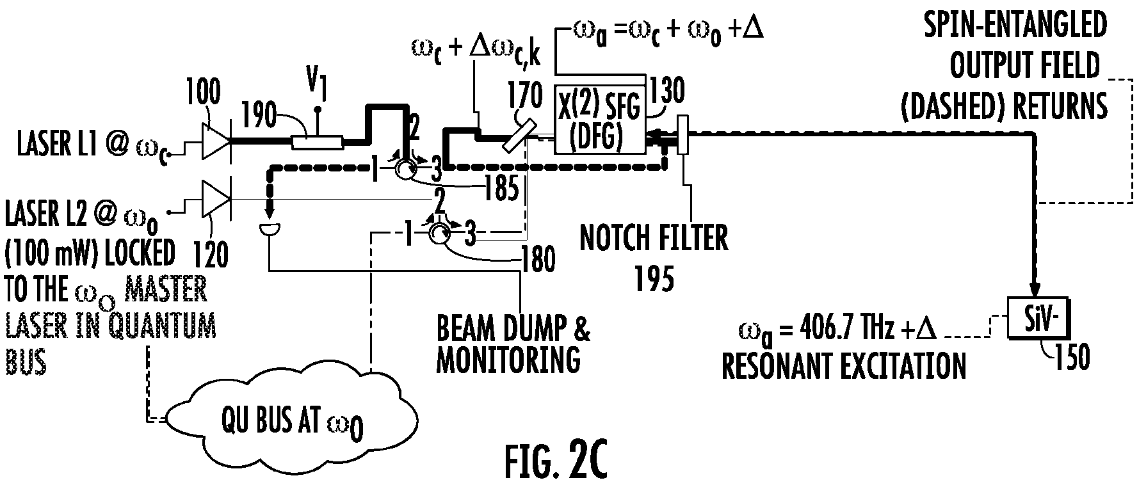

FIGS. 2A-2C show three different embodiments for the quantum repeater node j.

FIG. 2A shows a first embodiment, where an oscillator 100 is used to create $\omega_c$. This laser may have a power output of 200 mW, although other power levels may be used. An electro-optic (EO) phase modulator 110 is used to create a first frequency that is offset from $\omega_c$ by a known quantity $\Delta\omega_{c,k}$, using two voltages $V_1$, $V_2$. As described above, a laser 120 is locked to the master oscillator to produce frequency $\omega_o$. The master oscillator may be a frequency modulated distributed feedback (DFB) laser, a fiber laser or an external cavity diode laser. This laser 120 may have a power output of 100 mW, although other power levels may be used. These two frequencies $\omega_o$ and $\omega_c+\Delta\omega_{c,k}$ then enter the sum frequency generator 130, which may be a periodically poled lithium niobate (PPLN).

The output of the sum frequency generator 130 then enters splitter 140 that transmits 95% of the energy in one direction and only 58 in the opposite direction. In this embodiment, only 5% of the energy from the sum frequency generator 130 is transmitted to the quantum memory, since only about 100 μW is needed by the diamond silicon vacancy (SiV) color center 150. The splitter 140 is used to control the power being applied to the diamond silicon vacancy (SiV) color center 150. The output of the splitter 140 provides the excitation frequency, $\omega_a=\omega_o+\omega_{c,k}+\Delta\omega_c$ to the diamond silicon vacancy (SiV) color center 150. Note that while the quantum memory is shown as being a diamond silicon vacancy (SiV) color center, any suitable quantum memory may be used.

The splitter 140 may include a fast switch such that the signal from the sum frequency generator 130 only passes to the diamond silicon vacancy color center 150 for a small period of time, such as about 3 ns.

Note that the resonant excitation frequency for the diamond silicon vacancy (SiV) color center 150 is roughly 406.7 THz, which can be achieved by the proper selection of $\omega_o$ and $\omega_c+\Delta\omega_{c,k}$. If different quantum memory is used, the value of $\omega_c$ and $\Delta\omega_{c,k}$ may be varied accordingly to achieve the desired resonant frequency of the memory. However, the value of $\omega_o$ may remain unchanged.

The light reflected from the diamond silicon vacancy color center 150 is down-converted back to the quantum bus channel (i.e., the O band), possibly with small RF offsets, which are the quantum DWDM channels. Specifically, after generating the first frequency $(\omega_c+\Delta\omega_{c,k})$, the electro-optic (EO) phase modulator 110 is used to create a second frequency that is $(\omega_c+\Delta\omega_{c,k}-j_{QITU}\Delta\omega_{oQITU})$. This is done by modifying the two voltages $V_1$ and $V_2$. This output from the EO phase modulator 110 enters a difference frequency generator 160. This frequency is then subtracted from the output from the splitter 140, which has an excitation frequency of $\omega_a=\omega_o+\omega_c+\Delta\omega_{c,k}$, resulting in a frequency of $\omega_o+j_{QITU}\Delta\omega_{oQITU}$.

Note that in some embodiments, the output from the electro-optic (EO) phase modulator 110 may be split such that the majority of the power, such as up to 908, is directed toward the difference frequency generator 160.

FIG. 2B shows a second embodiment. The path to the diamond silicon vacancy (SiV) color center 150 is similar to that in FIG. 2A. Identical components have been given the same reference designators. In this embodiment, two dichroic beamsplitters are used. The first dichroic beamsplitter 170 is located between the electro-optic (EO) phase modulator 110 and the sum frequency generator 130. The output from the laser 120, which is locked to the master oscillator to produce frequency $\omega_o$, enters an optical circulator 180 via the second port. The frequency $\omega_o$ exits the optical circulator 180 via the third port and is directed to the first dichroic beamsplitter 170, such that it enters the sum frequency generator 130. In the forward direction (i.e., toward the diamond silicon vacancy (SiV) color center 150), the first dichroic beamsplitter 170 allows the first output from the electro-optic (EO) phase modulator 110 $(\omega_c+\Delta\omega_{c,k})$ and the frequency $\omega_o$ to enter the sum frequency generator 130. The second beamsplitter 175 is located between the sum frequency generator 130 and the diamond silicon vacancy (SiV) color center 150. In the forward direction, the second beamsplitter 175 splits part of the output from the sum frequency generator 130 and directs it to a beam dump or beam monitoring port. This may be to control the amount of power being supplied to the quantum memory. The remainder of the output from the sum frequency generator 130 is directed to the diamond silicon vacancy (SiV) color center 150.

The light reflected from the diamond silicon vacancy color center 150 is down-converted back to the quantum bus channel (i.e., the O band), possibly with small RF offsets, which are the quantum DWDM channels. Specifically, the sum frequency generator 130 is used in reverse mode, so as to function as a difference frequency generator. A second output from the electro-optic (EO) phase modulator 110 $(\omega_c+\Delta\omega_{c,k}-j_{QITU}\Delta\omega_{oQITU})$ enters the output of the sum frequency generator 130, along with the output from the quantum memory (i.e. the diamond silicon vacancy color center 150). The output from the sum frequency generator 130, when in reverse mode, then enters the optical circulator 180 on the third port and exits on the first port to the quantum bus channel. Because the sum frequency generator 130 is used in two modes, and the EO phase modulator 110 is used to generate two different frequencies, it may be necessary to introduce timing gates to ensure proper operation. The solid lines in FIG. 2B show the path to the quantum memory (which occurs at time duration from 0 nsec to $T_{gate}$ nsec), while the dotted lines show the path from the quantum memory (which occurs after $T_{gate}$ nsec).

FIG. 2C shows a third embodiment. Identical components have been given the same reference designators. In this embodiment, time gating is eliminated through the use of a second optical circulator 185. The frequency $\omega_c+\Delta\omega_{c,k}$, which is generated by frequency shifter 190 using a first voltage, enters the second optical circulator 185 on the second port and exits on the third port. The output from the laser 120, which is locked to the master oscillator to produce frequency $\omega_o$, enters an optical circulator 180 via the second port. The frequency $\omega_o$ exits the optical circulator 180 via the third port and is directed to the first dichroic beamsplitter 170, such that it enters the sum frequency generator 130 along with the output of frequency shifter 190 $(\omega_c+\Delta\omega_{c,k})$. The output from the sum frequency generator 130 passes through a notch filter 195 such that the frequency $\omega_a=\omega_o+\omega_c+\Delta\omega_{c,k}$ is directed to the diamond silicon vacancy (SiV) color center 150. The path from the diamond silicon vacancy color center 150 is as follows. A second voltage is supplied to the frequency shifter 190 to generate $(\omega_c+\Delta\omega_{c,k}-j_{QITU}\Delta\omega_{oQITU})$. This output, along with the output from the diamond silicon vacancy color center 150, pass through the output of the sum frequency generator 130, which serves as a difference frequency generator. The output of the difference frequency generator appears at the input and is split using first dichroic beamsplitter 170. One path from the first dichroic beamsplitter 170 enters the third port of the optical circulator 180 and exits on the first port, which is in communication with the quantum bus channel. The second path from the first dichroic beamsplitter 170 enters the third port of the second optical circulator 185 and exits on the first port, which may be in communication with a beam dump and monitoring port.

Note that in each embodiment, the system includes two frequency sources ($\omega_o$ and $\omega_c$). Further, in each embodiment, a device is used to frequency shift the frequency $\omega_c$.

Two different frequencies are created: $\omega_c+\Delta\omega_{c,k}$, and $\omega_c+\Delta\omega_{c,k}-j_{QITU}\Delta\omega_{oQITU}$. The system also includes a sum frequency generator and a difference frequency generator. Note that in some embodiments, these may be a single component. Further, in some embodiments, timing gates or optical circulators are used to separate the path to the quantum memory from the path from the quantum memory. Further, in each embodiment, the $\omega_o$ frequency is unchanged. Thus, in all embodiments, the following functions are performed:

An offset is added to the carrier frequency to generate $\omega_c+\Delta\omega_{c,k}$;

$\omega_c+\Delta\omega_{c,k}$ is added to $\omega_o$ to generate the frequency used by the quantum memory (also referred to as $\omega_a$ or $\omega_{j,k}$);

An offset is added to the carrier frequency to generate $\omega_c+\Delta\omega_{c,k}-j_{QITU}\Delta\omega_{oQITU}$; and $\omega_c+\Delta\omega_{c,k}-j_{QITU}\Delta\omega_{oQITU}$ is subtracted from $\omega_{j,k}$ to generate frequency used for communications ($\omega_o+j_{QITU}\Delta\omega_{oQITU}$).

Further, in each embodiment, a timing mechanism is used to control the flow of energy to and from the quantum memory. This may be done using timing gates or using optical circulators.

FIGS. 3A-3B show two embodiments that may be utilized to form a midpoint source in a zero-added-loss-multiplexing (ZALM) scheme. The ZALM scheme is described in K. C. Chen, P. Dhara, M. Heuck, Y. Lee, W. Dai, S. Guha, and D. Englund, "Zero-Added-Loss Entangled-Photon Multiplexing for Ground- and Space-Based Quantum Networks", Physical Review Applied 19, 054029 (2023), found at dx.doi.org/10.1103/PhysRevApplied. 19.054029, which is incorporated by reference in its entirety.

The ZALM scheme combines heralded photon pair generation from spontaneous parametric downconversion (SPDC) with spectral mode conversion to interface the photons with quantum memories. This eliminates multiplexing losses that normally occur when switching between different frequency modes in the photon source.

Specifically, the ZALM scheme uses a pulse-pumped SPDC source to generate spectrally pure but probabilistic photon pairs, which are then frequency shifted to match the target quantum memory. The initial photon frequencies are determined by measuring one photon from each pair, while the other unmeasured photon is routed to the memory. This heralding process provides spectral information to guide the frequency conversion of the routed photon. Overall, ZALM improves entanglement distribution rates by avoiding multiplexing losses and exploiting the higher efficiency of downlinks compared to uplinks in satellite-based networks. Moreover, local heralding information at the quantum repeaters provides an improvement in the entanglement generation rate from $O(\eta)$ per channel use (per transmission) to $O(\sqrt{\eta})$ per channel use, where $\eta$ is the channel transmission (whether free-space or fiber, component losses, etc). Given that long-distance transmissions are commonly limited by low $\eta<10^{-2}-10^{-4}$, the entanglement distribution rate improvement from $O(\sqrt{\eta})$ to $O(\eta)$ practically amounts to an improvement of 10-100 times or more.

The present disclosure facilitates the implementation of the ZALM midpoint entanglement source because it already includes the necessary hardware, including the frequency-stabilized laser sources, the nonlinear frequency conversion, and the single-photon detection, as well as the optical message passing protocol provided by the network. Specifically, FIG. 1 shows the pumping 21 of two simultaneously spontaneous parametric down conversion (SPDC) processes heralded by measuring the frequency detuning $\Delta_{idler\ photons}$ of the idler photons 22 away from a specified quantum bus channel with a frequency resolution of $\Delta\omega_{memory}$~1-100 MHz, resulting in the generation of a heralded entangled "signal photon" pair in the quantum bus channel 23. The frequency-heralding information is sent along with the entangled "signal photon" states to the quantum memory nodes (which are assumed to be some distance of meters to hundreds of km away). At the frequency conversion stage to the quantum memories, this frequency-heralding information $\Delta_{signal\ photons}=-\Delta_{idler\ photons}$ is added as an RF-shift to the pump laser, ensuring frequency atomic memory, is matching to the as conventional in the UQB scheme. Conveniently, two problems are solved at once here: the heralding at the midpoint source not only performs spectral shifting to the quantum memory, but also matches its spectral bandwidth since measuring the idler photons with spectral resolution $\Delta\omega_{memory}$ projects the signal photons into the same narrow spectral bands.

To create the pump for the SPDC processes in ZALM, FIGS. 3A-3B illustrate two embodiments. In FIG. 3A, sum-frequency 3B generation is used for the creation of $\omega_o+\omega_p$, where $\omega_p$ is chosen so that energy conservation $\omega_o+\omega_p=\omega_s+\omega_i$ (i.e. signal photon frequency+idler photon frequency) yield an idler photon suited for detection on silicon-based single-photon avalanche diodes (SPADs), which can be uncooled. With $\omega_i$~350 THz and $\omega_o$~230 THz, this implies $\omega_p$~$\omega_i$ as it may be desirable that the signal photon also be in the universal quantum bus band (so $\omega_s$~$\omega_o$). Here, the convenience of using silicon SPADs comes at the cost of another laser for SFG (laser 115), but this laser does not require excellent stability: frequency stability <<$\Delta\omega_{memory}$ is sufficient. In FIG. 3B, the need for the second laser is avoided by generating the SPDC pump field from second-harmonic-generation of $\omega_o$.

In both embodiments, the laser 120, which is locked to the master oscillator, is used in the creation of heralding. In FIG. 3A, a sum frequency generator 130 is used to combine the $\omega_o$ and $\omega_p$ frequencies. As seen in FIG. 3A, the $\omega_p$ frequency is generated by laser 115. That output is used as the input to a spontaneous parametric down converter (SPDC) 200 that converts the incoming photon into two photons, one at a signal frequency and one at an idler frequency. The rate of conversion for the SPDC 200 may be about 1%. Further, heralding requires the creation of 2 pairs of photons. Therefore, the probability of two pairs of photons may be given by $(0.01)^2$. Note that the probability of the creation of a pair of photons may be varied by changing the laser power. In certain embodiments, the SPDC 200 may be a Fabry Perot cavity having a second order medium. The $\omega_o+\omega_p$ frequency is equal to the combined frequencies of the signal photon and the idler photon. In certain embodiments, the frequency of the signal photon is in the O band, such as between 200 THz and 300 THz. The SPDC 200 may be a Fabry Perot cavity, where photons exit from the cavity at both ends. In these embodiments, the system expects that one pair of photons exits from each end. However, in other embodiments, the cavity may be single-ended. On the first end of the SPDC 200, a first beam splitter 210 is used to direct the signal photon to the quantum bus, while passing the idler photon. A second beam splitter 215 is used to direct the idler photon to the linear optics Bell measurement circuit 230. On the second end of the SPDC 200, a third beam splitter 220 is used to direct the idler photon to the linear optics Bell measurement circuit 230. This third beam splitter 220 allows the signal photon to pass through and onto the UQB.

This linear optics Bell measurement circuit 230 may include a nonpolarized beam splitter and one or more silicon single photon avalanche diodes (SPADs). Of course, the linear optics Bell measurement circuit 230 may be implemented in other ways, as is known in the art. The outputs from the linear optics Bell measurement circuit 230 are provided as heralding signals on the UQB. Thus, two remote nodes, which may be referred to as a first node (which may be referred to as Alice) and a second node (which may be referred to as Bob) receive both a heralding signal and a signal photon.

In FIG. 3B, a similar circuit is used. However, the laser 115 is removed and a second harmonic generator 135 receives the $\omega_o$ frequency, and creates a frequency doubled signal. The output of the second harmonic generator 135 is used as the input to the spontaneous parametric down converter 200. The rest of the circuit is as described above with respect to FIG. 3A.

Figure 4:
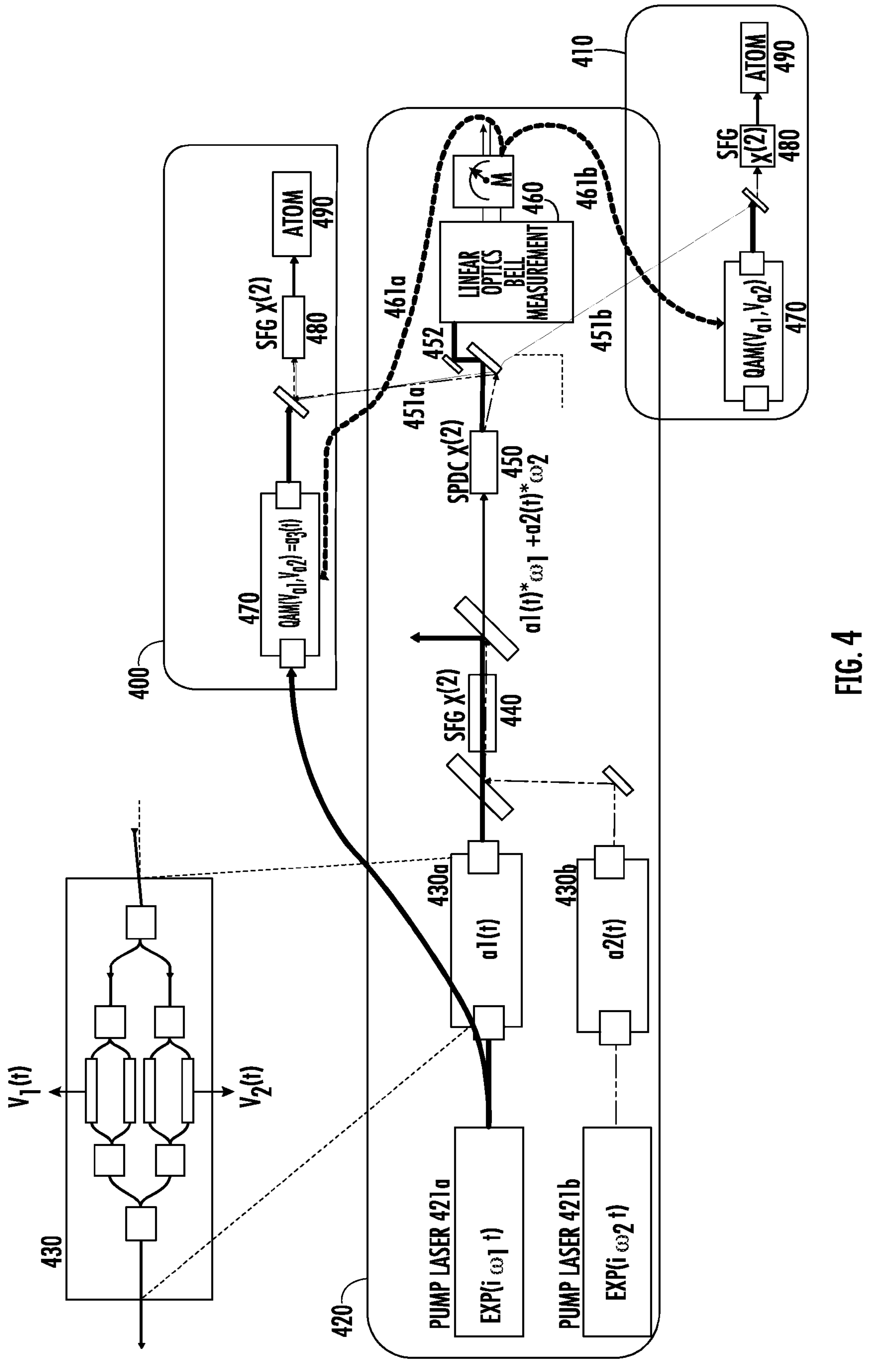
FIG. 4 shows two nodes with a midpoint photon entanglement source.

FIG. 4 shows a system that includes a first node 400, a second node 410 and a ZALM midpoint entanglement source 420 according to one embodiment. The ZALM midpoint entanglement source 420 includes two frequency sources, which may be a first laser 421*a*, having a frequency $\omega_1$ and a second laser 421*b* having a frequency $\omega_2$. Signals from each laser enter a respective modulator 430*a*, 430*b*. Each modulator 430*a*, 430*b* is configured to perform both phase and amplitude modulation of the respective incoming signal. An exploded view of the modulator is shown in FIG. 4. These modulators may include EO phase modulators and gain stages, allowing each modulator 430*a*, 430*b* to vary both the phase and amplitude of the incoming signal. In certain embodiments, these modulators may be conventional IQ optical modulators that may include a plurality of Mach-Zehnder Modulators (MZM). The output from the modulator 430*a* may be expressed as $a1(t)*\omega_1$, while the output from the modulator 430*b* may be expressed as $a2(t)*\omega_2$.

These outputs from the modulators 430*a*, 430*b* then enter a sum frequency generator 440, which combines them to form a higher frequency signal, wherein the output frequency is the sum of the frequencies of the input signals, expressed as $a1(t)*\omega_1+a2(t)*\omega_2$.

This output signal then serves as the input to a SPDC 450, which is used to generate two pairs of photons. The idler photons 452 from the SPDC 450 enter a linear optic Bell measurement circuit 460. The SPDC 450 and the linear optic Bell measurement circuit 460 may be as described above with respect to FIGS. 3A-3B.

The signal photons 451*a*, 451*b* are then transmitted to the first node 400 and the second node 410. As noted above, these signal photons 451*a*, 451*b* may have a frequency in the O band, such as between 200 THz and 300 THz. Further, heralding information 461*a*, 461*b* from the linear optic Bell measurement circuit 460 is transmitted to the first node 400 and the second node 410, respectively. If desired, measurements may be made of the heralding information. Note that the frequency of the heralding information is not limited by this disclosure.

Note that the output of the first laser 421*a* is also provided to the first node 400 and the second node 410. Both remote nodes include a modulator 470 which is capable of modulating the phase and amplitude of the incoming signal, generating an output expressed as $a3(t)*\omega_1$. The heralding information 461*a*, 461*b* also serves as an input to the modulator 470. This heralding information 461*a*, 461*b* may be used to tune the output of the modulator 470.

This output, $a3(t)*\omega_1$, as well as the signal photon 451*a*, 451*b*, are provided as inputs to a sum frequency generator 480. The output from the sum frequency generator 480 is then passed to the quantum memory 490, similar to as described in FIGS. 2A-2C. Note that the heralding information is used to tune the output of the modulator 470 such that when this output is summed with the signal photon 451*a*, 451*b*, the resulting frequency is equal to that needed by the quantum memory 490.

An aspect of this design is that optimal quantum control may be achieved. This system described three sets of modifications, a1(t), a2(t) and a3(t). By monitoring the density matrix for the spin states of the first node 400 and the second node 410, the degree of entanglement may be estimated. Variation of the three sets of modifications, a1(t), a2(t) and a3(t) may affect the degree of entanglement. By proper configuration of these parameters, entanglement may be maximized.

The above disclosure describes the use of signal and idler photons for use with the ZALM system. This may be implemented in a variety of ways.

Consider a laser in the c-band having a wavelength of 1550 nm ($\omega_c/2\pi=1.93\times10^{14}$). If this is combined with a signal having a wavelength of 1410 nm, and provided to a sum frequency generator, the resulting output will have a wavelength of about 737 nm. This output may be used to drive the SiV spin transitions. The signal received from the quantum memory can then be downconverted back to a frequency in the e-band.

The SPDC in the ZALM source may also be driven by the same laser source. The sum frequency generator may again output a signal having a wavelength of 737 nm. The SPDC may then convert this to a signal photon at 1410 nm, and an idler photon at ~1550 nm. Bell state measurements of the idler photons at 1550 nm heralds the entangled signal photons. In the linear optics Bell state measurement circuit, the two SPDC processes are mixed, followed by dense wavelength division multiplexing (DWDM) at 50 GHz channel spacing and Teraxion group velocity dispersion to produce ~$10^4$ heralding modes.

In another embodiment, the signal and idler modes in the mid-point ZALM source can be spectrally far apart. For example, a signal having a wavelength of 1064 nm may be provided to a second harmonic generator to produce an output signal having a wavelength of 532 nm. This signal is then provided to the SPDC having a second order crystal to produce photons at 800 nm and 1588 nm. The 800 nm idler photons can conveniently be measured using Si SPADs.

Note that while FIG. 4 shows the output from the first laser 421*a* being transmitted to the first node 400, in other embodiments, the first node 400 may generate this frequency locally.

When comparing the system of FIG. 4 to the nodes shown in FIGS. 2A-2C, it is noted that the signal photon 451*a*, 451*b* is analogous to the $\omega_o$ input, and the output from the first laser 421*a* is analogous to the $\omega_c$ input. Further, the modulator 470 is a more sophisticated version of the EO phase modulator 110 used in FIG. 2A. Further, note that the signal photon 451*a*, 451*b* is not modified before it enters the frequency generator 480, which is identical to the signal path for the $\omega_o$ input in FIGS. 2A-2C. Thus, in some embodiments, the frequency of the signal photons 451*a*, 451*b* is selected to be at the $\omega_o$ frequency, as described above. Further, output from the first laser 421*a* ($\omega_1$) may be the same as $\omega_c$, although in some embodiments, these frequencies may differ.

The present system has many advantages. First, clock synchronization is achieved across the network via *one* telecom frequency, to which a node may lock a local oscillator via phase locked loop+heterodyne detection or injection locking. In this way, the UQB obviates the need for expensive and complicated laser oscillators at the qubit frequency. It also obviates the need for expensive and complicated locking of that laser across the quantum network.

Second, this system allows full freedom of the choice of local oscillator $\omega_c$ which can be either very close to $\omega_o+\Delta$ (with $\Delta/2\pi$~8 GHz) for superconducting resonators or very different at $\omega_c/2\pi$~170 THz to couple to diamond silicon vacancy (SiV) color centers or other atomic qubits, as illustrated in FIG. 1.

Third, the optics component (node j without the quantum memory) serves as a "midpoint" entangled photon source which can greatly improve entanglement distribution rates.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A quantum network, comprising: a plurality of nodes, wherein each node j comprises a plurality (k) of quantum memories, wherein each node j utilizes an oscillator output to drive quantum memory transitions at frequencies $\omega_{j,k}$, wherein the plurality of nodes are connected across a telecom fiber network; a quantum bus channel that allows a master laser output at frequency $\omega_o$ to be distributed across the quantum network; and a non-linear crystal to couple the output at frequency $\omega_o$ and the oscillator outputs at frequencies $\omega_{j,k}$.

2. The quantum network of claim 1, wherein the quantum memories comprise a modality selected from the group consisting of atoms, microwaves in superconductors, ions, and solid state spins.

3. The quantum network of claim 1, wherein the node j uses a local oscillator to generate $\omega_{c,k}$, which is used to produce an electromagnetic field $\omega_{j,k}=\omega_{c,k}+\omega_0$ by sum-frequency generation.

4. The quantum network of claim 3, wherein the node j locally generates $\omega_{c,k}=\omega_{c,0}+\Delta\omega_{c,k}$ where $\Delta\omega_{c,k}$ is dynamically adjusted to tune from a local laser oscillator at $\omega_{c,0}$ to $\omega_{c,k}$.

5. The quantum network of claim 3, wherein the node j interacts the quantum memory at frequency $\omega_{j,k}$ with the electromagnetic field produced by sum-frequency generation at $\omega_{j,k}$.

6. The quantum network of 1, wherein the node j uses a local oscillator to generate $\omega_{c,k}-j_{QITU}\Delta\omega_{oQITU}$, which is used to produce an electromagnetic field $\omega_0+j_{QITU}\Delta\omega_{oQITU}$ from $\omega_{j,k}$ by difference-frequency generation.

7. The quantum network of claim 6, wherein the electromagnetic field $\omega_0+j_{QITU}\Delta\omega_{oQITU}$ is a different quantum bus channel.

8. The quantum network of claim 1, wherein the node j comprises a local oscillator to generate $\omega_{c,0}$, a first modulator to generate $\omega_{c,k}=\omega_{c,0}+\Delta\omega_{c,k}$, a second modulator to generate $\omega_{c,k}-j_{QITU}\Delta\omega_{oQITU}$, a sum-frequency generator to create $\omega_{j,k}=\omega_{c,k}+\omega_0$, and a difference-frequency generator to create $\omega_0+j_{QITU}\Delta\omega_{oQITU}$.

9. The quantum network of claim 8, wherein the first modulator and the second modulator are one component that is used in a time multiplexed manner.

* * * * *